UNITED STATES PATENT OFFICE 2,384,753

MONOAZO DYESTUFFS

Arthur Howard Knight and William Elliot Stephen, Blackley, England, assignors to Imperial Chemical Industries Limited, a corporation of Great Britain No Drawing. Application December 22, 1942, Serial No. 469,845. In Great Britain December 29, 1941

1 Claim. (Cl. 260—199)

This invention relates to new monoazo dyestuffs suitable for colouring animal fibres.

According to the invention we make the dyestuffs by diazotising an amine of the general formula X—CO—NY—R—NH$_2$, in which R stands for m- or p-phenylene, optionally substituted by methyl, methoxy, or sulphonic groups or other simple azo dyestuff substituents, X stands for mono-chloro- or -bromo-alkyl (C$_1$ to C$_3$), Y stands for hydrogen, alkyl (C$_1$ to C$_6$), aralykyl, cycloalkyl, alkoxy-alkyl, or aryl, and coupling with a 2-acylamino-8-naphthol-6-sulphonic acid, in which the acyl group is formyl, alkoxyformyl, succinyl (i. e., β-carboxypropionyl), benzoyl, arylsulphonyl, hydroaromatic sulphonyl, hydroaromatic carbonyl, aralkoxy-A, cycloalkoxy-A, aryloxy-A or alkoxy (C$_1$ to C$_4$)-A (A representing acetyl, propionyl or butyryl), said cyclic acyl groups optionally bearing nuclear substituents, for example methyl or halogen, and the remaining hydrogen of the amino group may be replaced by alkyl, hydroxyalkyl or aryl.

Also according to the invention we use the dyestuffs in colouring animal fibres, e. g., wool and silk.

As examples of diazo components which can be employed according to the invention, we mention:

4-amino-1-N-ethyl-omega-chloroacetanilide
4-amino-1-N-isopropyl-omega-chloroacetanilide
4-amino-1-N-n-butyl-omega-chloroacetanilide
4-amino-2-N-ethyl-omega-chloroacet-toluidide
4-amino-2-N-ethyl-omega-bromopropion-toluidide
3-amino-omega-chloroacetanilide-4-sulphonic acid
2-amino-4-N-ethyl-omega-chloroacet-toluidide
4-amino-2-N-ethyl-α-bromobutyryl-toluidine
4-amino-2-N-ethyl-α-bromopropion-toluidide
4-amino-2-N-ethyl-omega-chloropropiontoluidide
4-amino-1-N-ethyl-omega-chloropropionanilide
4-amino-1-N-ethyl-omega-bromopropionanilide
4-amino-1-N-sec-butyl-omega-chloroacetanilide
4-amino-omega-chloroacetanilide-3-sulphonic acid
4-amino-2-N-ethyl-omega-chloroacetanisidide
4-amino-1-N-n-butyl-omega-chloroacetanilide-2-sulphonic acid
4-amino-1-N-ethyl-omega-bromoacetanilide
4-amino-1-N-benzyl-omega-chloro-acetanilide
4-amino-1-N-cyclohexyl-omega-chloroacetanilide
5-amino-2-N-cyclohexyl-omega-chloroacet-toluidide
3-amino-1-N-benzyl-omega-chloroacetanilide
4-amino-2-N-benzyl-omega-chloroacet-toluidide
4-amino-1-N-phenyl-omega-chloroacetanilide
4-amino-1-N-cyclohexyl-omega-chloropropionanilide
4-amino-1-N-cyclohexyl-omega-bromopropionanilide
4-amino-1-N-cyclohexyl-α-bromopropionanilide
4-amino-1-N-cyclohexyl-omega-bromo-acetanilide
4-amino-2-N-benzyl-omega-chloroacetanisidide
4-amino-1-N-cyclohexyl-omega-chloroacetanilide-2-sulphonic acid
3-amino-1-N-benzyl-omega-chloropropionanilide (obtainable by methods described in British Patent 544,409 (or our U. S. Patent No. 2,346,492), 4-amino-1-N-β-ethoxyethyl-omega-chloroacetanilide (obtainable by acetylating N-β-ethoxyethylaniline, nitrating removing the acetyl group by hydrolysing, causing the resulting 4-nitro-1-N-β-ethoxyethylaniline to react with chloroacetyl chloride and reducing), and 4-amino-1-N-cyclohexyl-omega-chloroacetanilide-2-sulphonic acid (obtainable by chloroacetylating sodium 4-nitro-1-N-cyclohexylaniline-2-sulphonate and reducing).

Derivatives of 2-amino-8-naphthol-6-sulphonic acid, or, as it may be more briefly termed, gamma acid, which may be used, for example, in accordance with the invention, are listed below. They are obtainable by interaction between gamma acid, or the appropriate N-alkyl, -hydroxyalkyl or -aryl derivatives thereof, and the necessary acid chloride or anhydride. For instance, N-o-chlorophenoxyacetyl-gamma acid may be made by interaction between gamma acid and o-chlorophenoxyacetyl chloride (got by the action of thionyl chloride on o-chlorophenoxyacetic acid); N-cyclohexyloxyacetyl-gamma acid can be made by interaction between gamma acid and cyclohexyloxyacetyl chloride (produced by the action of thionyl chloride on cyclohexyloxyacetic acid, the manufacture of which acid is referred to in British Patent 413,728); N-methoxyacetyl-N-phenyl-gamma acid may be obtained by interaction between N-phenyl-gamma acid and the anhydride or chloride of methoxyacetic acid.

N-methoxyacetyl-gamma acid
N-ethoxyacetyl-gamma acid
N-n-butoxyacetyl-gamma acid
N-α-methoxypropionyl-gamma acid
N-α-methoxy-n-butyryl-gamma acid
N-γ-ethoxy-n-butyryl-gamma acid
N-phenoxyacetyl-gamma acid
N-o-chlorophenoxyacetyl-gamma acid
N-p-chlorophenoxyacetyl-gamma acid
N-p-methylphenoxyacetyl-gamma acid
N-5-chloro-2-methylphenoxyacetyl-gamma acid
N-β-phenoxypropionyl-gamma acid
N-cyclohexyloxyacetyl-gamma acid
N-methoxyacetyl-N-methyl-gamma acid
N-methoxyacetyl-N-β-hydroxyethyl-gamma acid
N-methoxyacetyl-N-phenyl-gamma acid
N-benzyloxyacetyl-gamma acid
N-ethoxyformyl-N-ethyl-gamma acid
N-formyl-gamma acid
N-ethoxyformyl-gamma acid
N-succinyl-gamma acid
N-succinyl-N-methyl-gamma acid
N-methoxyformyl-gamma acid
N-o-chlorobenzoyl-gamma acid
N-benzoyl-N-γ-hydroxypropyl-gamma acid
N-benzoyl-gamma acid
N-benzoyl-N-β-hydroxyethyl-gamma acid
N-benzoyl-N-methyl-gamma acid
N-benzoyl-N-ethyl-gamma acid
N-o-chlorobenzoyl-N-methyl-gamma acid
N-benzenesulphonyl-gamma-acid
N-p-toluenesulphonyl-gamma acid
N-m-bromobenzoyl-gamma acid
N-tetrahydronaphthalene-2 - sulphonyl - gamma acid
N-formyl-N-phenyl-gamma acid
N-hexahydrobenzoyl-gamma acid The new dyestuffs of the present invention dye wool from an acid bath and yield, in general, various shades of red or reddish brown, the dyeings being characterised by very good fastness to severe washing and milling, and good fastness to light.

The invention is illustrated, but not limited, by the following examples in which the parts are by weight.

*Example 1*

21.25 parts of 4-amino-1-N-ethyl-omega-chloroacetanilide are dissolved in a mixture of 300 parts of water and 25 parts of 36% hydrochloric acid. 6.9 parts of sodium nitrite in 50 parts of water are added. The diazonium solution so-obtained, after cooling to 5–10° C., is added to a stirred and cooled mixture of 33.3 parts of sodium 2-(methoxyacetyl)-amino - 8-naphthol-6-sulphonate, 600 parts of water and 21 parts of anhydrous sodium carbonate. The mixture is stirred until coupling is complete. 250 parts of sodium chloride are added to precipitate the dyestuff which is then filtered off, washed with 20% sodium chloride solution, and dried.

The new dyestuff is red, dissolving in water with a scarlet-red colour and in concentrated sulphuric acid with a red colour. It dyes wool from a dyebath containing sulphuric acid and Glauber's salt in scarlet-red shades, the dyeings having very good fastness to severe washing, milling and perspiration, and good fastness to light.

The above coupling can also be carried out in the presence of other mild acid-binding agents such as sodium bicarbonate or sodium acetate.

*Example 2*

22.6 parts of 4-amino-2-N-ethyl-omega-chloroacet-toluidide are dissolved in a mixture of 400 parts of water and 25 parts of 36% hydrochloric acid. After cooling to 5–10° C., there are added 6.9 parts of sodium nitrite in 50 parts of water. The solution of the diazonium compound so-obtained is added with stirring to a cooled mixture of 33.3 parts of sodium 2-methoxyacetyl-amino-8-naphthol-6-sulphonate, 600 parts of water, 21 parts of anhydrous sodium carbonate and 80 parts of sodium chloride. Coupling is rapid and, when complete, a further 160 parts of sodium chloride are added and the precipitated dyestuff filtered off, washed with saturated sodium chloride solution and dried.

The new dyestuff is red-brown, dissolving in water with a scarlet-red colour and in concentrated sulphuric acid with a red colour. It dyes wool from an acid dyebath in bright scarlet-red shades, the dyeings having very good fastness to severe washing and milling, and good fastness to light.

*Example 3*

26.25 parts of 4-amino-1-N-cyclohexyl-omega-chloroacetanilide are dissolved in a mixture of 350 parts of water and 25 parts of 36% hydrochloric acid and diazotised at 15–30° C., by the addition of 7 parts of sodium nitrite. The resulting diazonium solution, after filtration if necessary, is cooled to 5–10° C., and added to a cooled and stirred solution of 33.3 parts of sodium 2-(methoxyacetyl)-amino-8-naphthol - 6 - sulphonate in 550 parts of water to which have been added 21 parts of anhydrous sodium carbonate. When coupling is complete the dyestuff is filtered off and dried. It is yellowish red, dissolving in water with a yellowish scarlet colour and in concentrated sulphuric acid with a bluish red colour.

The new dyestuff dyes wool from a dyebath containing sulphuric acid and Glauber's salt in bright scarlet-red shades, the dyeings having very good fastness to severe washing, and milling, and good fastness to light.

*Example 4*

To a solution of 28.65 parts of sodium 3-amino-omega - chloroacetanilide - 4 - sulphonate in 450 parts of water there are added 35 parts of 36% hydrochloric acid followed by 6.9 parts of sodium nitrite. The diazonium solution so obtained is added to a solution at 5°–7° C. of 33.3 parts of sodium 2 - methoxyacetylamino-8-naphthol-6-sulphonate in 550 parts of water to which 35 parts of anhydrous sodium carbonate and 100 parts of sodium chloride have been added. The dyestuff so-obtained is filtered off, washed with 10% aqueous sodium chloride and dried.

The new dyestuff dyes wool from an acid bath in dull reddish orange shades, the dyeings having good fastness to severe washing and light.

*Example 5*

21.25 parts of 4-amino-1-N-ethyl-omega-chloroacetanilide are diazotised as in Example 1. The diazonium solution so-obtained is gradually added to a solution at 10°–12° C. of 40 parts of sodium 2-phenoxyacetylamino-8-naphthol-6-sulphonate in 800 parts of water containing 28 parts of crystalline sodium acetate. When coupling is complete the dyestuff is filtered off, washed with 5% aqueous sodium chloride, and dried.

The new dyestuff dyes wool from a dyebath containing sulphuric acid and Glauber's salt in scarlet shades, the dyeings having good fastness to severe washing, milling and light.

*Example 6*

22.65 parts of 4-amino-2-N-ethyl-omega-chloroacet-toluidide are diazotised as in Example 2. The diazonium solution so-obtained is added to a stirred solution of 41 parts of sodium 2-benzyloxyacetylamino-8-naphthol-6-sulphonate in 800 parts of water containing 28 parts of crystalline sodium acetate. When coupling is complete, 70 parts of sodium chloride are added to precipitate the dyestuff, which is then filtered off, washed with 5% aqueous sodium chloride and dried.

The new dyestuff dyes wool from an acid bath in bright scarlet shades, the dyeings having very good fastness to severe washing and milling and good fastness to light.

*Example 7*

28.5 parts of 4-amino-2-N-ethyl-omega-bromopropiontoluidide are dissolved in 320 parts of water and 25 parts of 36% hydrochloric acid. 6.9 parts of sodium nitrite are added. The diazonium solution so-obtained is added to a stirred solution at 5°–7° C. of 33.3 parts of sodium 2-methoxyacetylamino-8-naphthol-6-sulphonate in 800 parts of water containing 21 parts of anhydrous sodium carbonate. Coupling is rapid and, when complete, the coupling medium is neutralised with acetic acid. 120 parts of sodium chloride are added. The mixture is heated to 50°–55° C. The coagulated dyestuff is then filtered off, washed with 15% aqueous sodium chloride and dried.

The new dyestuff dyes wool from a dyebath containing sulphuric acid and Glauber's salt in dull scarlet shades, the dyeings having good fastness to severe washing, milling and light.

If, instead of the 4-amino-2-N-ethyl-omega-bromopropiontoluidide used above there are employed 22.65 parts of 4-amino-1-N-ethyl-omega-chloropropionanilide, a dyestuff is obtained which dyes wool in somewhat redder shades, the dyeings having similar fastness properties, whilst the use of 22.65 parts of 4-amino-1-N-iso-propyl-omega-chloroacetanilide as diazo component results in a dyestuff giving yellowish red shades on wool, the dyeings having very good fastness to severe washing and milling and good fastness to light.

*Example 8*

22.65 parts of 4-amino-2-N-ethyl-omega-chloroacet-toluidide are diazotised as in Example 2. The solution of the diazo compound is then added to a solution of 34.7 parts of sodium 2-(N-methoxyacetyl - N - methyl)-amino-8-naphthol-6-sulphonate in 400 parts of water containing excess of sodium acetate. When coupling is complete 120 parts of sodium chloride are added to precipitate the dyestuff which is then filtered off, washed with 20% aqueous sodium chloride and dried.

The new dyestuff dyes wool from an acid bath in red-brown shades, the dyeings having very good fastness to severe washing and milling and good fastness to light.

If, instead of 34.7 parts of sodium 2-(N-methoxyacetyl - N - methyl)-amino-8-naphthol-6-sulphonate there are employed 37.7 parts of sodium 2-(N-methoxy-acetyl-N-β-hydroxyethyl)-amino-8-naphthol-6-sulphonate, a dyestuff is obtained having similar properties.

*Example 9*

27.45 parts of 3-amino-1-N-benzyl-omega-chloroacetanilide are dissolved in 400 parts of water and 25 parts of 36% hydrochloric acid. Six and nine-tenths parts of sodium nitrite are added. The diazonium solution so-obtained, after filtration if necessary, is added to a stirred solution at 10–12° C. of 43 parts of sodium 2-(2'-chlorophenoxyacetyl) - amino-8-naphthol-6-sulphonate in 600 parts of water containing 28 parts of crystalline sodium acetate. When coupling is complete the precipitated dyestuff is filtered off, washed with 5% aqueous sodium chloride and dried.

The new dyestuff dyes wool from an acid bath in scarlet shades, the dyeings having very good fastness to severe washing and milling and good fastness to light.

*Example 10*

21.25 parts of 4-amino-1-N-ethyl-omega-chloroacetanilide are dissolved in a mixture of 300 parts of water and 25 parts of 36% hydrochloric acid. 6.9 parts of sodium nitrite are added. The diazonium solution so-obtained is cooled to 5–10° C. and added to a cooled and stirred mixture of 36.5 parts of sodium 2-benzoylamino-8-naphthol-6-sulphonate, 450 parts of water, 21 parts of anhydrous sodium carbonate and 40 parts of sodium chloride. Coupling is rapid and, when complete, further sodium chloride is added to throw down any dyestuff still in solution. The new dyestuff is then filtered off, washed with 10% sodium chloride solution and dried. It is dull red in colour and dissolves in water with a scarlet-red colour and in concentrated sulphuric acid with a dull bluish-red colour. It dyes wool from a dyebath containing sulphuric acid and Glauber's salt in scarlet-red shades, the dyeings having very good fastness to severe washing, milling and perspiration, and good fastness to light.

*Example 11*

The above example is carried out, the 21 parts of anhydrous sodium carbonate being replaced by 28 parts of crystalline sodium acetate. A dyestuff is obtained which dyes wool from a dyebath containing sulphuric acid and Glauber's salt in somewhat yellower and brighter shades of scarlet, the dyeings having similar fastness properties.

*Example 12*

22.6 parts of 4-amino-1-N-ethyl-omega-chloropropionanilide are employed in place of the 4-amino-1-N-ethyl-omega-chloroacetanilide in Example 11. A new dyestuff is obtained which dyes wool from an acid bath in scarlet-red shades of good fastness to severe washing, milling and light.

*Example 13*

22.65 parts of 4-amino-1-N-ethyl-omega-chloropropionanilide are dissolved in 300 parts of water and 25 parts of 36% hydrochloric acid and diazotised by the addition of 6.9 parts of sodium nitrite. The diazonium solution is stirred into a solution at 5–10° C. of 38 parts of sodium 2-N-benzoyl - N - methyl-amino-8-naphthol-6-sulphonate in 600 parts of water containing 21 parts of anhydrous sodium carbonate. When coupling is complete, 60 parts of sodium chloride are added and the dyestuff filtered off, washed with 5% aqueous sodium chloride and dried. It dyes wool from a dyebath containing sulphuric acid and Glauber's salt in reddish brown shades, the dyeings having good fastness to severe washing, milling and light.

If in the above example an equivalent amount of sodium 2-N-benzoyl-N-ethyl-amino-8-naphthol-6-sulphonate or of 2-N-(2'-chlorobenzoyl)-N-methyl - amino - 8 - naphthol-6-sulphonate is used in place of the sodium 2-N-benzoyl-N-methylamino - 8 - naphthol-6-sulphonate, a dyestuff having similar properties is obtained.

Example 14

26.65 parts of 4-amino-1-N-cyclohexyl-omega-chloroacetanilide are dissolved in a mixture of 350 parts of warm water and 25 parts of 36% hydrochloric acid. The solution is cooled to 15°–30° C. and a solution of 6.9 parts of sodium nitrite in 50 parts of water added. The diazonium solution so-obtained is filtered, if necessary, and after cooling to 5°–10° C. is gradually stirred into a similarly cooled solution of 33.3 parts of sodium 2-ethoxyformyl-amino - 8 - naphthol-6-sulphonate in 650 parts of water containing 28 parts of crystalline sodium acetate. When coupling is complete, the dyestuff is filtered off, washed with 5% aqueous sodium chloride and dried.

The new dyestuff dyes wool from a dyebath containing sulphuric acid and Glauber's salt in yellowish red shades, the dyeings having very good fastness to severe washing and milling and good fastness to light.

If, in place of the 33.3 parts of sodium 2-ethoxy-formyl-amino-8-naphthol - 6 - sulphonate there are used 38 parts of sodium 2-N-benzoyl-N-methylamino-8-naphthol-6-sulphonate or 36.5 parts of sodium 2-N-formyl-N-phenyl-amino-8-naphthol-6-sulphonate, dyestuffs are obtained which yield on wool reddish brown shades of good fastness properties.

Example 15

22.6 parts of 4-amino-2-N-ethyl-omega-chloro-acet-toluidide are dissolved in 400 parts of water and 25 parts of 36% hydrochloric acid, and diazotised at 5°–10° C. by the addition of 6.9 parts of sodium nitrite. The diazonium solution is added to a cooled and stirred mixture of 40.9 parts of sodium 2-N-benzoyl-N-$\beta$-hydroxyethyl-amino-8-naphthol-6-sulphonate, in 400 parts of water and 21 parts of anhydrous sodium carbonate. Coupling is rapid and, when complete, the dyestuff is precipitated by addition of 50 parts of sodium chloride, filtered off and dried.

The new dyestuff dyes wool from an acid dyebath in reddish brown shades of very good fastness to severe washing and milling and good fastness to light.

A dyestuff having similar properties is obtained if 2-N-benzoyl-N-$\beta$-hydroxyethyl-amino-8-naphthol-6-sulphonate used above is replaced by the equivalent amount of sodium 2-N-benzoyl-N-$\gamma$-hydroxy-propylamino-8-naphthol-6-sulphonate.

Example 16

26 parts of 4-amino-1-N-phenyl-omega-chloroacetanilide are dissolved in 400 parts of water and 25 parts of 36% hydrochloric acid and diazotised by the addition of 6.9 parts of sodium nitrite. The filtered diazonium solution is stirred into an aqueous solution at 5°–10° C. of 38.3 parts of disodium 2-succinylamino-8-naphthol-6-sulphonate containing an excess of sodium acetate. The azo dyestuff thrown down is filtered off, washed with 10% aqueous sodium chloride and dried.

The new dyestuff dyes wool from a dyebath containing sulphuric acid and Glauber's salt in red-brown shades, the dyeings having very good fastness to severe washing and milling.

Example 17

22.65 parts of 4-amino-1-N-isopropyl-omega-chloro-acetanilide are dissolved in 300 parts of water and 25 parts of 36% hydrochloric acid. 6.9 parts of sodium nitrite are added. The diazonium solution so obtained is gradually stirred into a mixture at 5°–10° C. of 41.5 parts of sodium 2-(p-toluenesulphonyl)-amino-8 - naphthol - 6 - sulphonate, 500 parts of water and 28 parts of crystalline sodium acetate. When coupling is complete the dyestuff is filtered off, washed with 5% aqueous sodium chloride and dried.

The new dyestuff dyes wool from an acid dyebath in scarlet shades, the dyeings having very good fastness to severe washing and good fastness to light.

A dyestuff having very similar properties is obtained if 24 parts of 4-amino-1-N-sec.butyl-omega-chloro-acetanilide are used instead of the 4-amino-1-N-isopropyl-omega - chloroacetanilide employed above.

Example 18

To 25.65 parts of 4-amino-1-N-$\beta$-ethoxyethyl-omega-chloroacetanilide dissolved in 300 parts of water and 25 parts of 36% hydrochloric acid, 6.9 parts of sodium nitrite are added. The diazonium solution is stirred into a mixture of 36.5 parts of sodium 2-benzoylamino-8-naphthol-6-sulphonate, 600 parts of water and 28 parts of crystalline sodium acetate. When coupling is complete 100 parts of sodium chloride are added to precipitate the dyestuff which is then filtered off, washed with 10% aqueous sodium chloride and dried.

The new dyestuff dyes wool from an acid bath in red shades, the dyeings having good fastness to severe washing, milling and light.

The corresponding dyestuff made from 24.25 parts of 4-amino-1-N-$\beta$ - methoxyethyl - omega - chloroacet-anilide in place of the 4-amino-1-N-$\beta$ - ethoxyethyl - omega - chloroacetanilide used above, yields red dyeings on wool of similar fastness properties.

Example 19

A solution of 27.45 parts of 3-amino-1-N-benzyl-omega-chloroacetanilide in 400 parts of water and 25 parts of 36% hydrochloric acid is diazotised by the addition of 6.9 parts of sodium nitrite. The resulting diazonium solution is filtered if necessary and stirred into a solution at 5°–10° C. of 38.3 parts of disodium 2-succinyl-amino-8-naphthol-6-sulphonate in 500 parts of water containing excess of sodium bicarbonate. The azo dyestuff is precipitated by the addition of sodium chloride, filtered off and dried. It dyes wool from an acid bath in yellowish red shades, the dyeings having good fastness to severe washing, milling and light.

The invention is further illustrated by the examples listed in the following table, wherein the shorter designation gamma acid has been used for 2-amino-8-napthol-6-sulphonic acid.

| Example No. | Diazo component | Coupling component | Shade on wool |
|---|---|---|---|
| 20 | 3-amino-omega-chloroacetanilide-4-sulphonic acid | N-benzoyl-N-methyl-gamma acid | Brown. |
| 21 | 4-amino-1-N-ethyl-omega-chloroacetanilide | ___do___ | Do. |
| 22 | 4-amino-1-N-n-butyl-omega-chloroacetanilide | ___do___ | Do. |
| 23 | 4-amino-1-N-cyclohexyl-omega-chloropropionanilide | N-benzoyl-N-methyl-gamma acid | Do. |
| 24 | 4-amino-1-N-ethyl-omega-chloroacetanilide | N-ethoxyformyl-N-ethyl-gamma acid | Dull scarlet. |
| 25 | 4-amino-2-N-ethyl-omega-bromopropiontoluidide | N-ethoxyformyl-gamma acid | Yellowish red. |
| 26 | 4-amino-2-N-ethyl-α-bromopropiontoluidide | N-methoxyformyl-gamma acid | Do. |
| 27 | 4-amino-1-N-isopropyl-omega-chloroacetanilide | N-tetrahydronaphthalene-2-sulphonyl-gamma acid | Red. |
| 28 | ___do___ | N-hexahydrobenzoyl-gamma acid | Do. |
| 29 | 4-amino-1-N-cyclohexyl-omega-chloropropionanilide | N-2-chlorobenzoyl-gamma acid | Scarlet. |
| 30 | ___do___ | N-(3-bromobenzoyl-gamma acid | Red. |
| 31 | 4-amino-2-N-benzyl-omega-chloroacet-toluidide | N-ethoxyformyl-gamma acid | Yellowish red. |
| 32 | 4-amino-omega-chloroacetanilide-3-sulphonic acid | N-benzoyl-N-methyl-gamma acid | Reddish brown. |

We claim:

The monazo dyestuff which in the form of its acid is represented by the formula

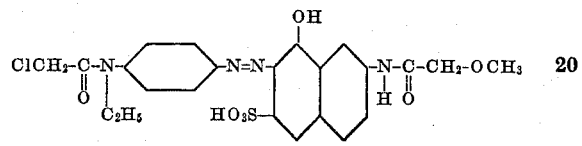

ARTHUR HOWARD KNIGHT.
WILLIAM ELLIOT STEPHEN.